US008776087B2

(12) United States Patent
Chun

(10) Patent No.: US 8,776,087 B2
(45) Date of Patent: Jul. 8, 2014

(54) MOBILE TERMINAL AND METHOD OF OPERATING THE SAME

(75) Inventor: Woo Chang Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 12/948,960

(22) Filed: Nov. 18, 2010

(65) Prior Publication Data

US 2011/0283296 A1 Nov. 17, 2011

(30) Foreign Application Priority Data

May 11, 2010 (KR) .................. 10-2010-0044117

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ........................................... 719/318

(58) Field of Classification Search
USPC ........................................... 719/318
See application file for complete search history.

(56) References Cited

U.S. PATENT DOCUMENTS

| 2005/0268301 | A1* | 12/2005 | Kelley et al. | 718/100 |
| 2010/0115334 | A1* | 5/2010 | Malleck et al. | 714/15 |
| 2010/0317406 | A1 | 12/2010 | Shigeta | |
| 2010/0332280 | A1* | 12/2010 | Bradley et al. | 705/9 |
| 2011/0126050 | A1* | 5/2011 | Begole et al. | 714/18 |

FOREIGN PATENT DOCUMENTS

EP 1835383 A1 * 9/2007 ............ G06F 3/033
WO WO 2008/081946 A1 7/2008

OTHER PUBLICATIONS

European Search Report dated Nov. 27, 2014 for corresponding Application No. 10197070.5.

* cited by examiner

*Primary Examiner* — Andy Ho
*Assistant Examiner* — Timothy A. Mudrick
(74) *Attorney, Agent, or Firm* — Ked & Associates, LLP

(57) ABSTRACT

A mobile terminal and a method of operating the same are disclosed herein. The method may include executing applications in a multitasking environment, detecting an event that requires a termination the applications, and saving a task list that includes a list of the active applications and their corresponding operational states, and terminating execution of the applications. The method further includes restoring the applications to their respective states prior to termination based on the task list.

14 Claims, 15 Drawing Sheets

MOBILE TERMINAL AND METHOD OF OPERATING THE SAME

CROSS-REFERENCE TO RELATED APPLICATION(S)

This application claims the priority benefit of Korean Patent Application No. 10-2010-0044117, filed in Korea on May 11, 2010 in the Korean Intellectual Property Office, the disclosure of which is incorporated herein by reference.

BACKGROUND

1. Field

A mobile terminal and a method of operating the same are disclosed herein.

2. Background

Mobile terminals and methods of operating the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Mobile terminals may be portable devices configured to provide users with various services such as voice calling, a video calling or conferencing, an information input/output service, a data storage, or the like. As the types of services provided by mobile terminals are diversified, the mobile terminals may be equipped with various complex functions such as capturing photos or moving pictures, playing music files or moving image files, providing game programs, receiving broadcast programs, and providing wireless internet services. For example, mobile terminals may be equipped as multimedia players as well as communication devices.

Mobile terminals may be configured to run multiple applications and provide various user interfaces (UIs) to support the diverse functions. Through the applications and UIs, users may play various multimedia data, browse the internet, send emails, or join a chat room with their mobile terminals. A mobile multitasking capability, which allows a variety of applications to concurrently execute on a mobile terminal, may also be provided in the mobile terminal.

However, when multiple tasks are temporarily interrupted or terminated because of various internal or external factors that are present in mobile terminals, users may have difficulty memorizing or recalling the names and corresponding statuses of all of the multiple tasks, and thus may not be able to properly resume the multiple tasks. Therefore, a method is needed to save information related to the multiple tasks, for example, a list of applications or tasks and their corresponding operational states, such that the multiple tasks may be restored or resumed at a later time.

Figure 1:
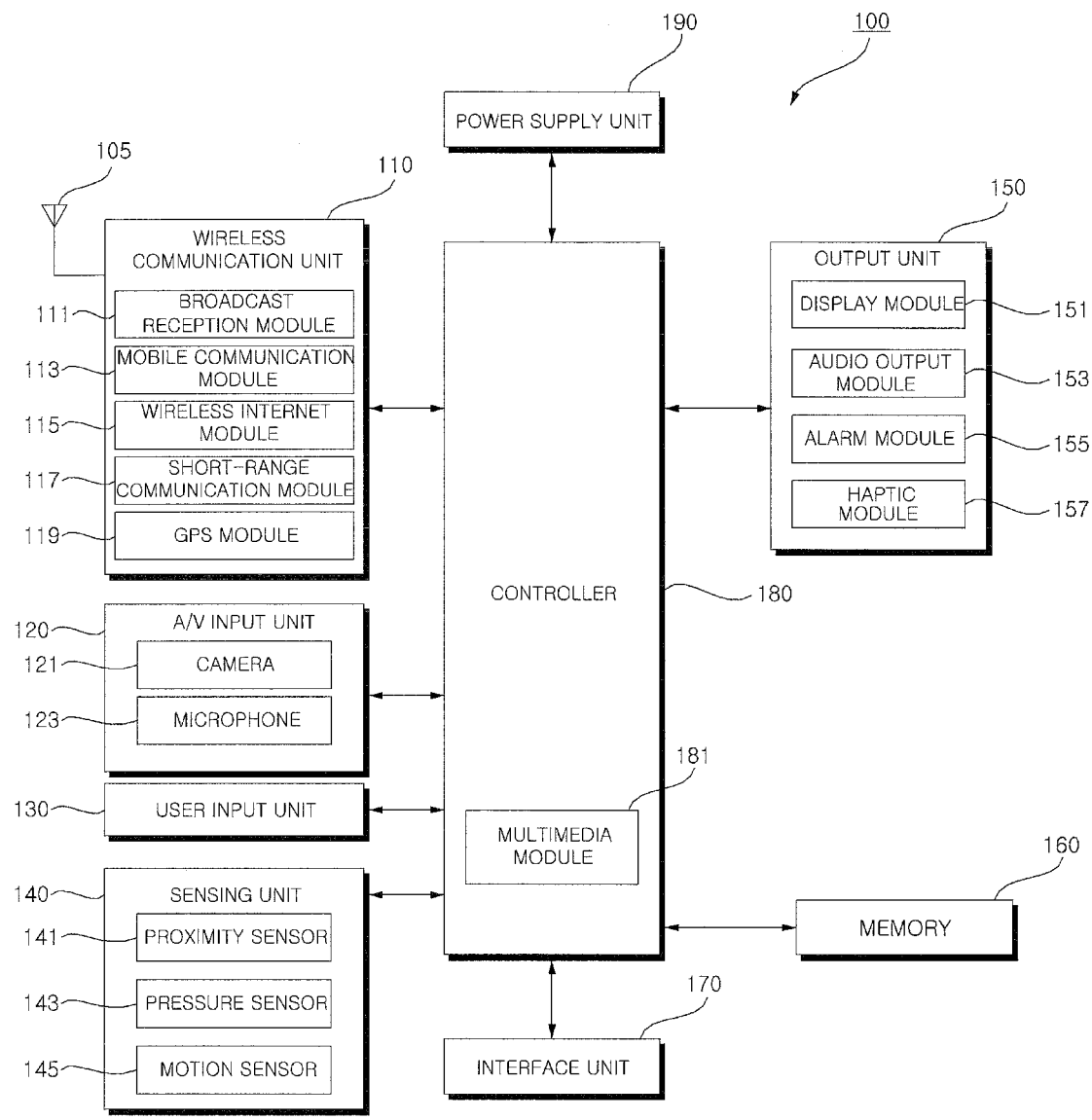
FIG. 1 illustrates a block diagram of a mobile terminal according to an exemplary embodiment of the present disclosure.

FIG. 1 illustrates a block diagram of a mobile terminal 100 according to an embodiment of the present disclosure. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into a plurality of smaller units.

The wireless communication unit 110 may include a broadcast reception module 111, a mobile communication module 113, a wireless internet module 115, a short-range communication module 117, and a global positioning system (GPS) module 119. The broadcast reception module 111 may receive at least one of a broadcast signal or broadcast-related information from an external broadcast management server through a broadcast channel. The broadcast channel may be a satellite channel or a terrestrial channel. Further, the broadcast management server may be a server which generates broadcast signals and/or broadcast-related information and transmits the generated broadcast signals and/or the generated broadcast-related information. The broadcast management server may also be a server which receives and transmits previously generated broadcast signals and/or previously generated broadcast-related information.

The broadcast-related information may include broadcast channel information, broadcast program information, and/or broadcast service provider information. The broadcast signal may be a TV broadcast signal, a radio broadcast signal, a data broadcast signal, a combination of a data broadcast signal and a TV broadcast signal, or a combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be received in the form of digital multimedia broadcasting (DMB) electronic program guide (EPG) or digital video broadcasting-handheld (DVB-H) electronic service guide (ESG).

The broadcast reception module 111 may receive broadcast signals using various broadcasting systems, such as DMB-terrestrial (DMB-T), DMB-satellite (DMB-S), media forward link only (MediaFLO), DVB-H, or integrated services digital broadcast-terrestrial (ISDB-T). In addition, the broadcast reception module 111 may be configured for other types of broadcasting systems other than those set forth herein. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), ZigBee, or other appropriate short-range communication protocols. Moreover, the GPS module 119 may receive position information from a plurality of GPS satellites. Moreover, the mobile terminal 100 may communicate over a wired/wireless communication system or a satellite communication system, and may thus be able to operate over a communication system capable of transmitting data in units of frames or packets.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151. Moreover, the image frames processed by the camera module 121 may be stored in the memory 160 or may be transmitted to an external device through the wireless communication unit 110. The mobile terminal 100 may also include a plurality of cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that may be readily transmitted to a mobile communication base station, and then output the data obtained by the conversion. The microphone 123 may use various noise removal algorithms to remove noise that may be generated during the reception of external sound signals.

The user input unit 130 may receive a user command or input by being activated by the user. The user input unit 130 may be implemented as a keypad, a dome switch, a static pressure or capacitive touch pad, a jog wheel, a jog switch, joystick, a finger mouse, or another appropriate input device. For example, if the user input unit 130 is implemented as a touch pad and forms a layer structure together with the display module 151, the user input unit 130 and the display module 151 may be collectively referred to as a touch screen.

The sensing unit 140 may determine a current state of the mobile terminal 100. For example, the sensing unit 140 may sense whether the mobile terminal 100 is opened up or closed, a position, orientation, or location of the mobile terminal 100, or whether the mobile terminal 100 is placed in physical contact with a user. The sensing unit 140 may then generate an appropriate signal that controls an operation of the mobile terminal 100. For example, when the mobile terminal 100 is a slide-type mobile phone, the sensing unit 140 may determine whether the mobile terminal 100 is opened or closed. In addition, the sensing unit 140 may determine whether the mobile terminal 100 is being powered by the power supply unit 190 or whether the interface unit 170 is connected to an external device.

The sensing unit 140 may include a proximity or detection sensor 141, a pressure sensor 143, and a motion sensor 145. The detection sensor 141 may be configured to remotely determine whether an object is positioned nearby or is approaching the mobile terminal 100. For example, the detection sensor 141 may detect an object by sensing change in an alternating magnetic field or a rate of change of static capacitance associated with the object. The sensing unit 140 may include a plurality detection sensor 141.

The pressure sensor 143 may determine whether pressure is being applied to the mobile terminal 100. The pressure sensor 143 may also measure a level of pressure applied to the mobile terminal 100. The pressure sensor 143 may be installed at specific positions on of the mobile terminal 100 where the detection of pressure may be necessary. For example, the pressure sensor 143 may be installed in the display module 151. In this case, it may be possible to differentiate a typical touch input from a pressure touch input, which is generated using a higher pressure level than that used to generate a typical touch input, based on data provided by the pressure sensor 143. In addition, when a pressure touch input is received through the display module 151, it may be possible to determine the level of pressure applied to the display module 151 upon the detection of a pressure touch input based on data provided by the pressure sensor 143.

The motion sensor 145 may determine a position and/or motion of the mobile terminal 100 and may include various types of sensor such as an acceleration sensor, a gyro sensor or the like. Acceleration sensors may convert vibration caused during acceleration of a device into an electric signal. Acceleration sensors using micro-electromechanical system (MEMS) technology may be used in various products including airbag systems for automobiles to gaming input devices. In general, one or more acceleration sensors may be incorporated into a single package to sense acceleration in various axial directions. In certain applications, detection in only one axial direction, for example, in the Z-axis direction, may be necessary. In this case, an acceleration sensor for the Z-axis may be provided on a substrate provided inside the mobile terminal 100. If sensors in additional directions are necessary, for example, in the X-axis or Y-axis, these sensors may be provided on the same substrate or on additional substrates. Moreover, gyro sensors may be provided to measure angular velocity and acceleration to sense a rotational motion of the mobile terminal 100.

The output unit 150 may output audio signals, video signals, or alarm signals. The output unit 150 may include the display module 151, an audio output module 153, an alarm module 155, a haptic module 157, or other appropriate output devices.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving video or still images.

As described above, the display module 151 may be configured to form a layer structure together with a touch pad, and may thus be able to serve as a touch screen capable of receiving a touch-based user input. If the display module 151 and the user input unit 130 are implemented as a touch screen, the display module 151 may be used not only as an output device but also as an input device capable of receiving information in response to a touch input made by the user.

If the display module 151 is implemented as a touch screen, the display module 151 may also include a touch screen panel and a touch screen panel controller. The touch screen panel may be a transparent panel attached to an exterior surface of the mobile terminal 100, and connected to an internal bus of the mobile terminal 100. The touch screen panel may continuously monitor whether the touch screen panel is being touched by the user. Once a touch input on the touch screen panel is detected, the touch screen panel may transmit a number of signals corresponding to the touch input to the touch screen panel controller. The touch screen panel controller may process the signals transmitted by the touch screen panel to transmit the processed signals to the controller 180. Then, the controller 180 may confirm whether the received signals represent a touch input as well as the location of the touch input on the touch screen panel based on the processed signals transmitted by the touch screen panel controller.

The display module 151 may also include electronic paper (e-paper). E-paper is a type of reflective display technology that may provide a resolution as high as ordinary ink on paper, wide viewing angles, and excellent visual properties. E-paper may be implemented on various types of substrates such as a plastic, metallic, or paper substrates and may display and maintain an image thereon even after power is cut off. In addition, e-paper may reduce the power consumption of the mobile terminal 100 because it may not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT) LCD, an organic light-emitting diode (OLED), a flexible display, or a three-dimensional (3D) display. The mobile terminal 100 may include a plurality of display modules 151. For example, the mobile terminal 100 may include an external display module and an internal display module.

The audio output module 153 may output audio data received by the wireless communication unit 110 during, for example, a call reception mode, a call mode, a recording mode, a voice recognition mode, a broadcast reception mode or other appropriate modes that require audio output. The audio output module 153 may also output audio data stored in the memory 160. In addition, the audio output module 153 may output various sounds associated with functions of the mobile terminal 100 such when as receiving a call or a message. The audio output module 153 may also include a speaker and a buzzer.

The alarm module 155 may output an alarm signal indicating an occurrence of an event in the mobile terminal 100. Examples of the event may include, for example, receiving a call signal, receiving a message, and receiving a key signal. Examples of the alarm signal output by the alarm module 155 may include, for example, an audio signal, a video signal, a vibration signal or other appropriate types of output signals. More specifically, the alarm module 155 may output an alarm signal upon receiving a call signal or a message. In addition, the alarm module 155 may receive a key signal and may output an alarm signal as a feedback to the key signal. Therefore, the user may be able to easily recognize the occurrence of an event based on an alarm signal output by the alarm module 155. An alarm signal that alerts the user to an event may be output not only by the alarm module 155 but also by the display module 151 or the audio output module 153.

The haptic module 157 may provide various haptic effects, such as vibration, that can be perceived by the user. If the haptic module 157 generates vibration as a haptic effect, the intensity and pattern of the vibration generated by the haptic module 157 may be altered in various manners. For example, the haptic module 157 may synthesize different vibration effects to output a desired haptic effect. Alternatively, the haptic module 157 may sequentially output different vibration effects.

The haptic module 157 may provide haptic effects, other than vibration, such as a haptic effect obtained using a pin array that moves perpendicularly to a contact surface of the skin, a haptic effect obtained by injecting or sucking in air through an injection hole or a suction hole, a haptic effect obtained by providing a stimulus to the surface of the skin, a haptic effect obtained through contact with an electrode, a haptic effect obtained using an electrostatic force, a haptic effect obtained by realizing the sense of heat or cold using a device capable of absorbing heat or generating heat, or other appropriate sensory effects. The haptic module 157 may be configured to enable the user to recognize a haptic effect using the kinesthetic sense of the fingers or the arms. The mobile terminal 100 may include a plurality of haptic modules 157.

The memory 160 may store various programs necessary for the operation of the controller 180. In addition, the memory 160 may temporarily store data, for example, a phonebook, messages, still images, moving images, or other appropriate types of data. The memory 160 may include at least one of a flash memory type storage medium, a hard disk type storage medium, a micro multimedia card type storage medium, a card type memory (e.g., a secure digital (SD) or extreme digital (XD) memory), a random access memory (RAM), a read-only memory (ROM), or another appropriate type of storage medium. Memory 160 may be provided on the Internet to, for example, operate as a web storage device.

The interface unit 170 may connect an external device to the mobile terminal 100. The interface unit 170 may be a wired/wireless headset, an external battery charger, a wired/wireless data port, a card slot or socket, or the like, to interface a memory card, a subscriber identification module (SIM) card or a user identity module (UIM) card, an audio input/output (I/O) terminal, a video I/O terminal, an earphone or other appropriate types of external devices. The interface unit 170 may receive data from an external device. It may also be powered by an external device. The interface unit 170 may transmit data provided by an external device to other components in the mobile terminal 100 or may transmit data provided by other components of the mobile terminal 100 to an external device. When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations including making/receiving a voice call, transmitting/receiving data, making/receiving a video call, or creating/storing/accessing a task list as disclosed in further detail hereinbelow. The controller 180 may include a multimedia player module 181 which plays multimedia data. The multimedia player module 181 may be implemented as a hardware device and may be installed in the controller 180. Alternatively, the multimedia player module 181 may be implemented as a software program.

The power supply unit 190 may provide power to various components of the mobile terminal 100. The power supply unit 190 may receive power from an external power source or an internal power source.

Figure 2:
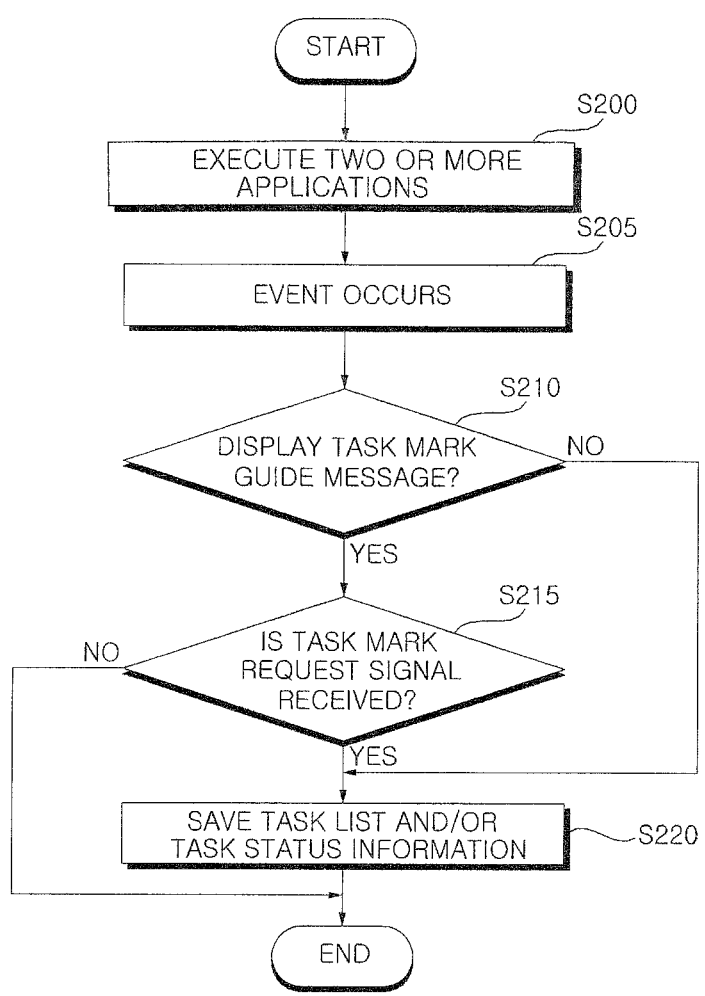
FIG. 2 illustrates a flowchart of a method of operating a mobile terminal to save a task list according to an exemplary embodiment of the present disclosure.

FIG. 2 illustrates a flowchart of a method of operating a mobile terminal to save a task list according to an exemplary embodiment of the present disclosure. Referring to FIG. 2, the controller 180 may execute one or more applications, in step S200. Thereafter, a task mark-requiring event may occur, in step S205.

A task mark, or task marking, may identify a state of one or more applications or tasks at a specific point during operation on the mobile terminal 100. For example, a task mark may identify the applications or tasks that are operating at a specific point in time when a task mark-requiring event occurs. The task mark may also identify states of system resources of the mobile terminal 100 at the time the task mark-requiring event occurs. Once the tasks are marked, they may be stored in a task list together with the corresponding state information. Thereafter, each task or a group of tasks within the task list may be accessed at any time to restore the tasks to their marked states.

The task mark-requiring event may be classified into an internal cause-driven event or an external cause-driven event. The internal cause-driven event may include a resource or battery shortage, a power off command, a request for a task other than that currently being executed, a call signal for making an outgoing call, a user command, or other appropriate internal events that requires an operational state of the mobile terminal 100 to be marked or stored. The external cause-driven event may include, a receipt of a call signal in connection with an incoming call, a request or command to terminate or interrupt a task due to, for example, a resource shortage, or other appropriate external events that requires the operational state of the mobile terminal 100 to be marked or stored.

Moreover, the task mark-requiring event may be an event generated by the controller 180 at preset time periods based on user preferences or settings. For example, the controller 180 may require task marking at preset time intervals to provide fault tolerance and data recovery. That is, the controller 180 may periodically save a task list and/or task status information such that the applications and tasks, including the documents and files being accessed, may be saved in case of failure or malfunction, or other event within the mobile terminal 100 that causes termination or interruption of the applications or tasks.

The controller 180 may also generate a task mark guide message or other similar notifications, and may display the task mark guide message on the display module 151, in step S210. The task mark guide message or similar notifications may alert a user to the occurrence of the task mark-requiring event. For example, when the task mark-requiring event occurs spontaneously in a multitasking environment, the task mark guide message may notify the user of the event such that the user may then decide whether to perform task marking.

After viewing the task mark guide message on the display module 151, the user may input a task mark request signal. The task mark request signal may be a user input signal at the mobile terminal 100 requesting task marking. Alternatively, there may be a pre-stored setting or a user preference setting to automatically input the task mark request signal to the controller 180 after the display of the task mark guide message. For example, the mobile terminal 100 may be configured to automatically generate the task mark guide message and the task mark request signal when certain internal or external cause-driven events occur, such as when the task mark-requiring event is automatically generated at predefined time intervals as described above or when a low battery level state is detected. In another embodiment, the mobile terminal 100 may also be configured to automatically generate the task mark request signal without displaying the task mark guide message.

Once the task mark request signal is received, in step S215, the controller 180 may save a list of tasks currently being executed and/or task status information associated with the tasks, in step S220. The task list may include a list of applications or tasks that are currently running on the mobile terminal 100. For example, the task list may include the names of one or more of the applications or tasks which are executing as well as documents or files opened by each of the applications. The task status information may include a current state information corresponding to the applications or tasks such that each application or task may be restored to their current state. For example, the task status information may include a current operational state of the applications or programs, a current operational state of the documents or files currently opened, or a current operational state of the mobile terminal. The task list and the corresponding task status information may be used to restore the one or more of the applications or tasks to a previous operational state. Accordingly, the task list may also be referred to as an application startup file, a startup group, or a restore list that may be used to launch or restore a predefined group of applications or tasks.

Moreover, the task status information may be stored within the task list or stored separately. For example, the task list and the task status information may be stored in a single file, or the task list and the task status information may each be stored as separate files on the mobile terminal 100. Thus, the task list data may be portable such that it may be moved from one device to another. For example, the task list and the task status information may be emailed or moved to a separate storage device by the user.

The task status information may include various information associated with the tasks or applications, and there is no restriction as to the format of the task status information. For example, the task status information may include at least one of remaining resource information of the mobile terminal 100, remaining battery power information of the mobile terminal 100, battery consumption rate information, filenames, format and location of data files enabled in connection with each application, an address of a webpage accessed or opened in connection with each application, a playback point position information of a multimedia file played in connection with each application, or other appropriate status information related to a task or application.

Moreover, the task list, including the task status information, may also be used to store device or user preference settings. For example, a variety of settings may be provided to allow the user to configure the mobile terminal 100. In many cases, the user may be forced to navigate through multiple menus on the mobile terminal 100 to modify those settings. In cases where certain settings are frequently changed or accessed, these settings may be stored in a task list as a task to allow a configuration of the mobile terminal 100 to be restored to a previous setting. For example, a task list may include a video player task and a display configuration task. When this task list is retrieved to restore the video player, the display configurations may also be modified according to the display configuration task. Modifying the device or user preference settings through a task list may allow faster changes to the various preset settings of the mobile terminal 100.

Figure 3:
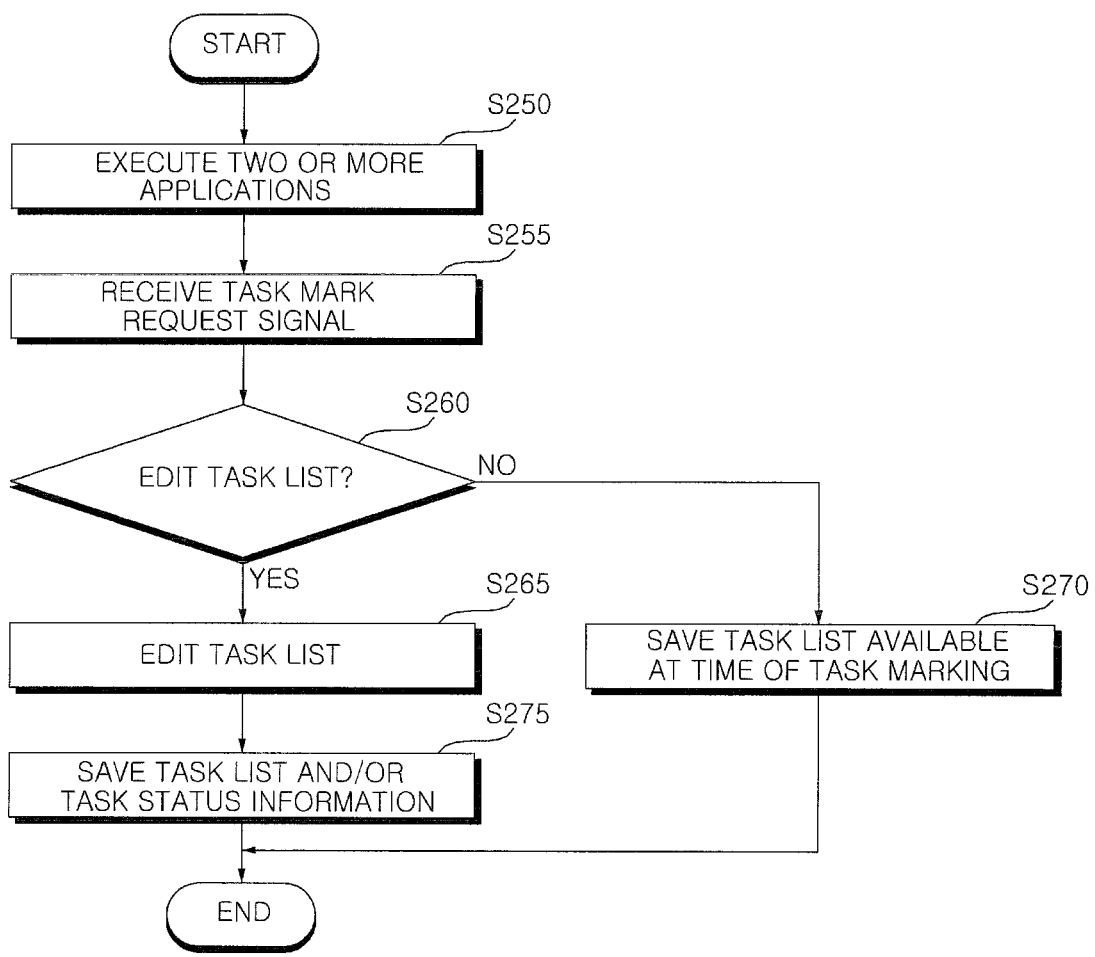
FIG. 3 illustrates a flowchart of a method of operating a mobile terminal to save and edit a task list according to another exemplary embodiment of the present disclosure.

FIG. 3 illustrates a flowchart of a method of operating a mobile terminal to save and edit a task list according to another exemplary embodiment of the present disclosure. Referring to FIG. 3, the controller 180 may execute a plurality of applications, in step S250. During multitasking of the applications, the controller 180 may receive a task mark request signal, in step S255. Before storing a list of tasks, the user may be prompted to edit the tasks or the task list. The controller 180 may determine whether a task edit signal has been received, in step S260.

If it is determined, in step S260, that the task edit signal has been received, the controller 180 may edit the task list, in step S265. Task editing may include terminating one or more of the applications or tasks which are currently running, changing a playback point of a multimedia file, adding/deleting programs or tasks to the task list, or other appropriate editing of the tasks. For example, the playback point of a multimedia file, which is saved at the time a corresponding task or application is marked, may be changed through task editing. In this case, when a marked task is retrieved, the playback of multimedia data may be resumed from the changed playback position.

Moreover, when multiple task lists are available, the task list may be edited by copying or moving one or more tasks from one task list to another. For example, once the task edit signal is received, in step S260, one or more tasks in the current task list may be copied or moved to another task list stored on the memory 160. Alternatively, one or more tasks from another task list may be imported to the current task list. Each task may also be copied into the current task list to create multiple instances of the task. For example, a multimedia playback task at a first playback position may be copied to create a second instance of the task. Thereafter, a playback position of the second instance of the task may be modified and stored in the task list together with the first instance of the task.

In another embodiment, the controller 180 may provide recommended changes to the task list, in step 265. For example, when a particular task or a stored task list is frequently used, the controller 180 may recommend addition of those tasks to the user. Moreover, the controller 180 may recommend deletion of tasks when it is determined that certain tasks or stored task lists are rarely used criteria for selecting a task for recommendation may be set in the user preferences.

Thereafter, the controller 180 may save the edited task list or task status information in memory 160, in step S275. On the other hand, if it is determined, in step S260, that the task edit signal has not been received, the controller 180 may save the original unedited task list and/or task status information that was available at the time of receipt of the task mark request signal, in step S270. The controller 180 may determine that the task edit signal has not been received if the task edit signal is not received within a predetermined period of time. Moreover, the controller 180 may determine that task editing is unnecessary, in step 260, and proceed to save the task, in step S270. For example, a user preference setting may be pre-stored on mobile terminal 100 to designate certain applications, tasks, or task mark requiring events to be directly saved without editing the task list such as when the task mark request signal is automatically generated as a result of a periodic task saving event.

Figure 4:
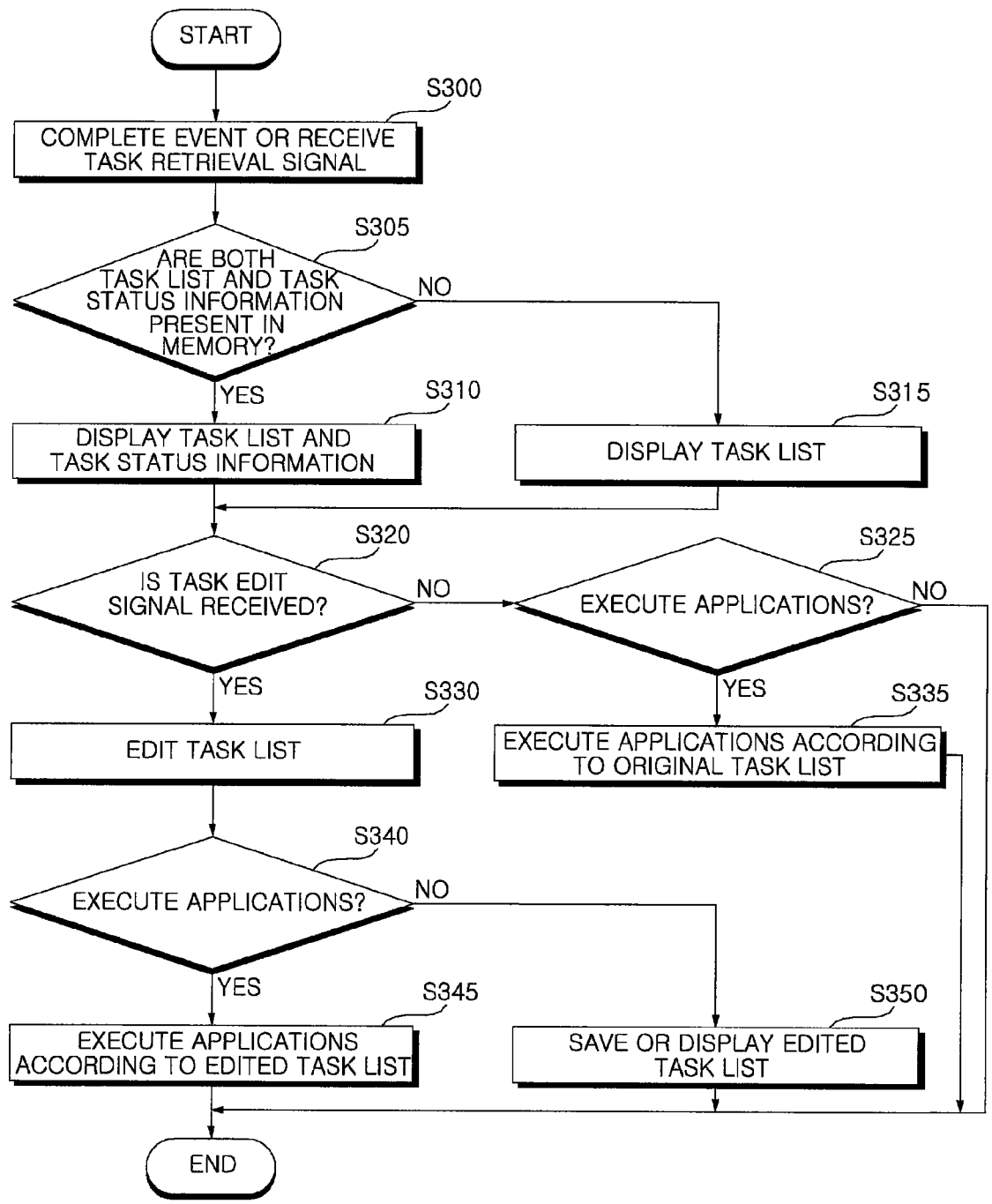
FIG. 4 illustrates a flowchart of a method of operating a mobile terminal to restore an application or task according to another exemplary embodiment of the present disclosure.

FIG. 4 illustrates a flowchart of a method of operating a mobile terminal to restore an application or task according to another exemplary embodiment of the present disclosure. In this embodiment, an application or task may be restored or executed when a task mark-requiring event has completed. For example, the task mark-requiring event may be an incoming/outgoing call, a low battery level condition, or another appropriate event. When the event has completed, e.g., the call session terminates or when the power level is restored, one or more of the applications or tasks stored on a task list may be restored.

Referring to FIG. 4, if a task mark-requiring event or situation is complete or if a task retrieval signal is received, in step S300, a series of processes to retrieve the marked tasks may be performed. The controller 180 may determine whether a task list and task status information are both stored in the memory 160, in step S305.

If it is determined, in step S305, that both the task list and the task status information are present in the memory 160, the controller 180 may display both the task list and the task status information on the display, in step S310. For example, the controller 180 may be configured to display the task list first, and then, if an additional signal is detected requesting the task status information, the task status information may be displayed. However, if it is determined, in step S305, that only the task list is available in the memory 160, the controller 180 may be configured to display only the task list on the display module, in step S315.

Once the task list is displayed on the display module 151, the user may edit the tasks in the displayed task list. The task list or individual tasks in the task list may be edited to delete, add, move, or copy individual tasks, to edit information related to the tasks such as a playback position of a multimedia file, or to edit documents or images associated with the tasks.

Referring again to FIG. 4, the controller 180 may determine whether a task edit signal, has been received, in step S320. The task edit signal may be a user input signal to edit the task list or the task status information. If the task edit signal is received, in step S320, the controller 180 may edit the displayed task list or each individual task in response to the task edit signal, in step S330. On the other hand, if it is determined, in step S320, that the task edit signal has not been received, the controller 180 may determine whether to execute the applications or tasks in the task list, in step S325. Thereafter, if it is determined that the applications or tasks in the task list should be executed, in step S325, the controller 180 may launch or execute the applications or tasks according to the original or unedited task list and/or task status information as displayed, in step S335. Otherwise, if it is determined that the applications or tasks in the task list should not be executed, in step S325, the process may end.

Once the displayed task list is edited as previously described, in step S330, the controller 180 may determine whether to execute the applications according to the edited task list, in step S340. For example, the controller 180 may determine whether to launch the applications or tasks based on a pre-stored user setting or a default setting. If it is determined that the applications or tasks should be executed, in step S340, the controller 180 may execute the applications or tasks corresponding to the tasks in the edited task list, in step S345.

On the other hand, if it is determined, in step S340, not to execute the applications or tasks corresponding to the tasks in the edited task list, the controller 180 may save the edited task list in the memory 160 or display the edited task list on the display module 151, in step S350. The controller 180 may determine that the applications or tasks should not be executed, for example, when the corresponding applications and tasks are preset in the preferences to not execute immediately upon completion of the event. Alternatively, the user may indicate, in step S340, that the application or task should not be executed. In this case, it may not be necessary to restore or execute the edited applications or tasks in the edited task list.

Figure 5:
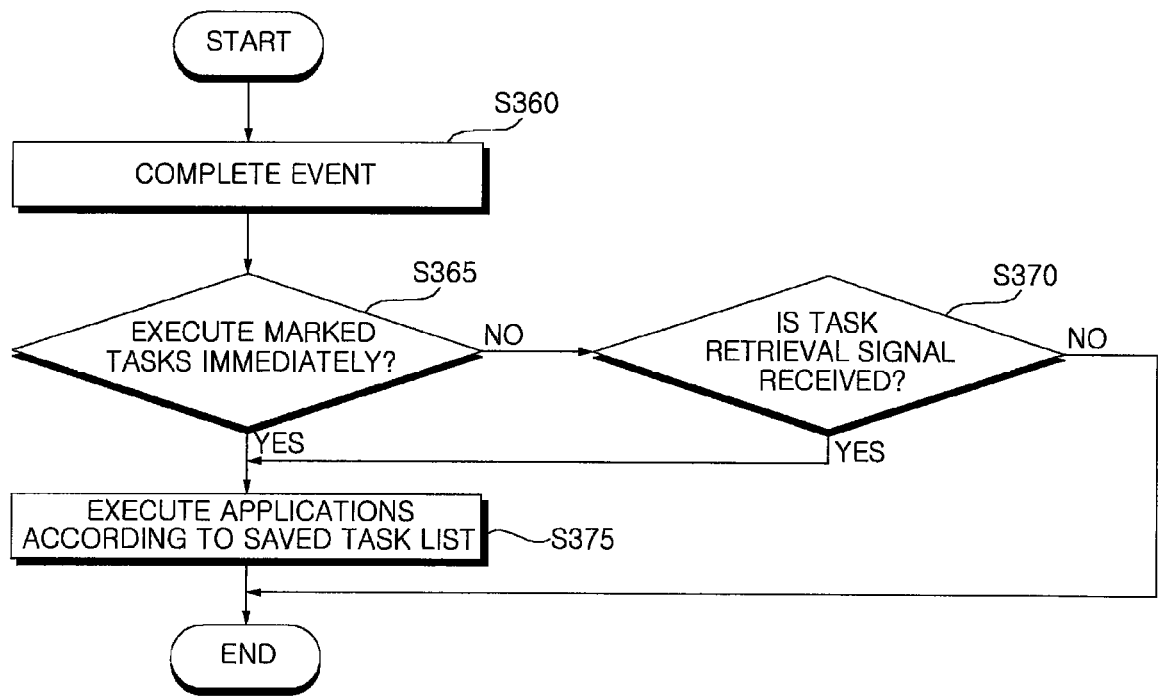
FIG. 5 illustrates a flowchart of a method of operating a mobile terminal to restore marked tasks based on an event according to another exemplary embodiment of the present disclosure.

FIG. 5 illustrates a flowchart of a method of operating a mobile terminal to restore marked tasks based on an event according to another exemplary embodiment of the present disclosure. In this embodiment, when a task mark-requiring event has completed, the corresponding marked tasks may be automatically retrieved.

Referring to FIG. 5, if it is determined that a condition or situation that caused a task mark-requiring event has completed or no longer exists, in step S360, the controller 180 may determine whether to immediately execute the marked tasks resulting from the task mark-requiring event, in step S365. Applications or tasks may be configured to automatically execute upon the completion of a predetermined event without a requirement for a predetermined signal or user command to retrieve a task list.

A task mark-requiring event may require an application to be interrupted or terminated. For example, for an incoming call event during certain multitasking sessions, it may not be necessary to terminate all tasks, but simply change an image displayed on the display module 151. The applications or tasks executing at the time of the incoming call may continue to operate in the background or they simply may be minimized. When these applications or tasks are not terminated, there is often no need to permanently save a task list and task status information. Applications or tasks which continue to run in the background may be restored and accessed again more quickly but at the cost of consuming a greater amount of resources. In this case, the tasks may be marked and a corresponding task list may be temporarily be saved to restore the tasks to their original states. In both cases, the interrupted or terminated tasks may be restored automatically upon completion of the event, as described in further detail hereinbelow.

In contrast, when an application is terminated, the application may be closed, shut down, or the processing of the application otherwise ended. Terminating an application may reduce the load placed on system resources. For certain types of events, it may be desirable or necessary to require termination of the applications or tasks, and then to immediately resume or restore the applications upon completion of the event. For example, when two or more applications require use of the same resource or component of the mobile terminal 100, one or more of the applications may need to be terminated or closed. Another type of event requiring termination of the applications or tasks may be a fault or malfunction, such at a low battery power condition. In these situations, the tasks may be marked and a corresponding task list may be stored on memory 160 to allow retrieval at a later time. Once the event or conflict ends, the terminated applications may be restored to their previous states using the stored task list.

Referring again to FIG. 5, if it is determined, in step S365, to execute the marked tasks immediately upon completion of the event, the controller 180 may retrieve the marked tasks and may resume the execution of the applications and tasks corresponding to the marked tasks, in step S375. On the other hand, if it is determined, in step S365, not to execute the marked tasks immediately upon completion of the event, the controller 180 may determine whether a task retrieval signal has been received, in step S370. The task retrieval signal may be a predetermined signal generated by the controller 180 based on pre-stored user or device settings corresponding to, for example, the applications, tasks, or the event.

If it is determined, in step S370, that the task retrieval signal has been received, the controller 180 may retrieve the marked tasks in response to the task retrieval signal, in step S375. Otherwise, the process may end without retrieving the marked tasks. Even in this case, however, the marked tasks may be retrieved at a later time if desired. A timer may also be used to ensure that the task retrieval signal is received within a reasonable time period.

As previously described, the task mark-requiring event may be generated as a result of various conditions in the mobile terminal 100. The task mark-requiring event may be generated, for example, when an operation of an application requires another application to be interrupted, terminated or shut down. The event may also be generated when the mobile terminal 100 is controlled to power down or turn off. Referring again to FIG. 5, when the event has completed, in step S360, the tasks marked as a result of the event may be restored, in step S375. For example, a task list stored in the memory 160 after a power off event may be configured to launch the applications or tasks after the power off event is over, e.g., when the mobile terminal is powered on. In another embodiment, a default task list may be configured to launch a predetermined group of applications each time the mobile terminal 100 is powered on. The predetermined group of applications may be launched to a previous operating state of the mobile terminal 100 or they may be launched in an initial state of each application.

Figure 6:
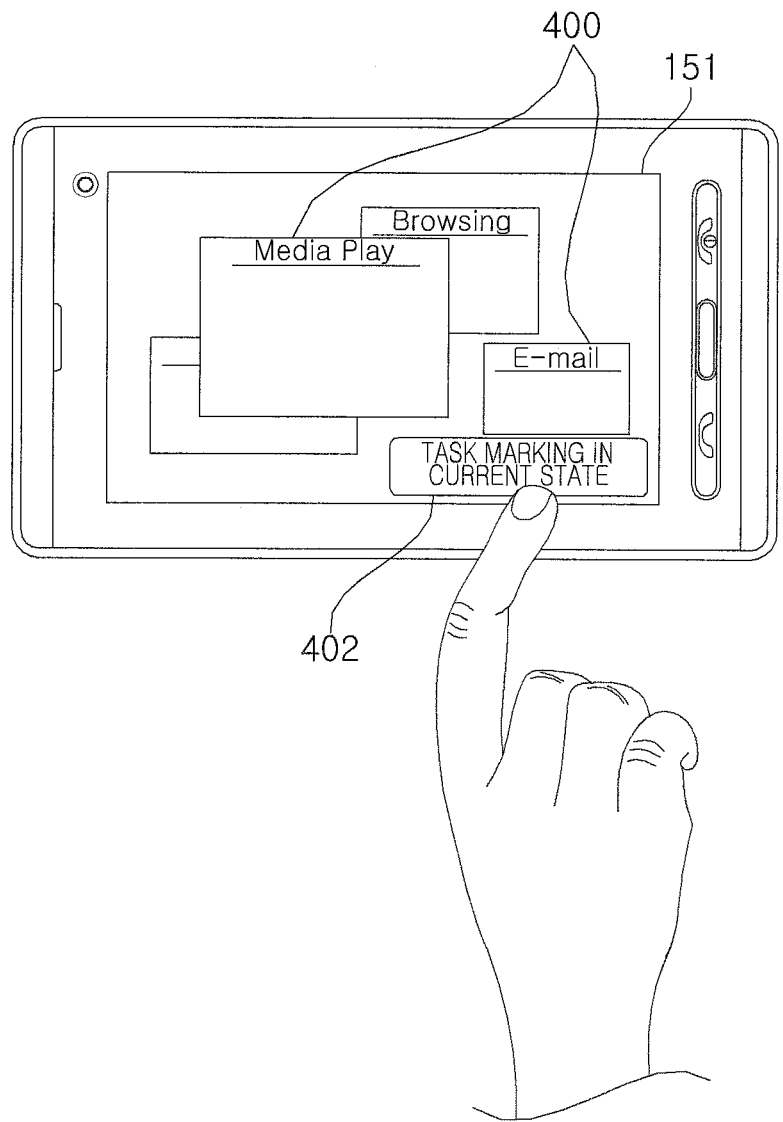
FIGS. 6 through 10 illustrate display screens of the mobile terminal during an operation to mark tasks.

FIGS. 6 through 10 illustrate display screens of the mobile terminal during an operation to mark tasks. Referring to FIG. 6, a plurality of applications may be executed at the same time in the mobile terminal 100. That is, the mobile terminal 100 may configured to provide a multitasking environment to execute a plurality of tasks at the same time. In this case, a plurality of display screens or windows 400 may be displayed on the display module 151 that correspond to the plurality of applications or tasks being executed.

When the mobile terminal 100 is in a multitasking environment, an additional button or menu key used to initiate task marking may be displayed on the display module 151. That is, during a multitasking mode where a plurality of tasks are concurrently executing on the mobile terminal 100, the controller 180 may display a "Mark Task in Current State" button or icon 402 to initiate task marking on the display module 151. Then, the user may generate a task mark request signal at any time by touching or clicking on the "Mark Task in Current State" button 402. Once task marking is initiated, additional controls or messages may be displayed to the user to perform the task marking and/or to provide instructions regarding the task marking process.

Moreover, the task marking controls may be provided from within a specific application. For example, the button 402 may be provided on each display screen 400 corresponding to each of the plurality of active applications or tasks. By activating the button 402 from within an application, a task list may be created for that particular application in the current state. The button 402 may also be used to add the application in its current state to a preexisting task list. For example, once button 402 is selected from within an application window 400, control options may be displayed to the user to allow addition of the application to a stored task list.

Figure 7:
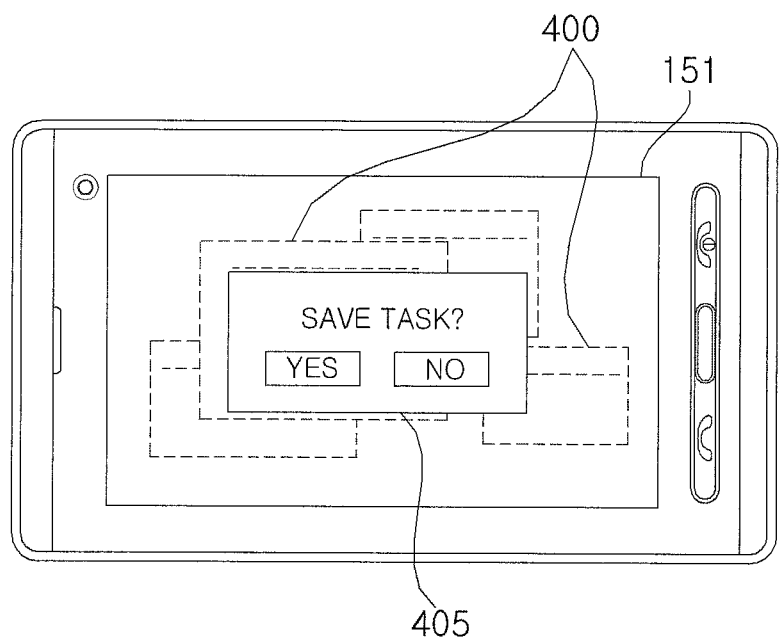

Referring to FIG. 7, if a task mark-requiring event occurs during operation of the mobile terminal 100, a task mark guide message 405 may be displayed on the display module 151. As described previously, the task mark-requiring event may be caused by a user input or by various internal or external factors. For example, the task mark-requiring event may be a user request to terminate a task such that an outgoing call may be made or a message may be sent. The user request may also be a request to mark tasks without terminating, interrupting, or otherwise affecting an operation of the applications or task running at the time. The task mark-requiring event may also include events caused by external factors, for example, a receipt of an incoming call or a message or an attempt by an external device to connect to the mobile terminal 100. Moreover, the task mark-requiring event may also include events caused by internal factors, for example, insufficient battery power for multitasking, a power off signal, or a collision or incompatibility between applications or tasks.

Particularly, when a collision or incompatibility exits between applications or tasks in a multitasking environment, one or more of the tasks may require termination. In this case, the user may decide whether to terminate, proceed with, or save each task based on the priority of each task. The priorities of tasks may be determined based on, for example, an order in which they are executed, a frequency of use of each application, or a user setting or a default setting pre-stored in the mobile terminal 100. When task marking is required because of a collision between tasks, the priorities of the tasks and a determination as to whether to perform task marking may be based on a default setting, rather than on a user setting. For example, when a collision between tasks occurs, a highest priority task may continue to be performed while the other tasks may be closed and saved through task marking.

Referring to FIG. 7, a task mark guide message may be displayed in response to a task mark-requesting event, for example, the "Save Task?" window 405. The user may select the "YES" button to initiate task marking, or the "NO" button to cancel task marking. Moreover, task marking may not be necessary if the user wishes to terminate a multitasking environment. In this case, the user may simply close all active applications without initiating task marking.

Figure 8:
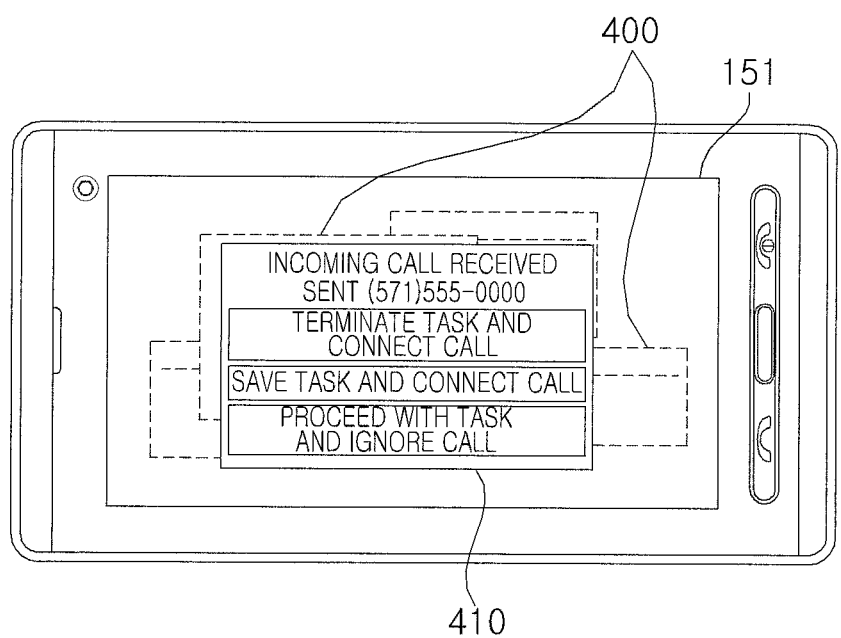

Referring to FIG. 8, if a call signal is received in a multitasking environment where a plurality of applications are being executed at the same time, a task mark selection window 410 may be displayed. Moreover, a task mark guide message may also be displayed as an option within the task mark selection window 410.

For example, the task mark selection window 410 may include a message indicating the occurrence of an event such as an incoming call and a UI image to allow the user to select various options. If the user chooses the "Terminate Task and Connect Call" button, the incoming call may be connected without performing task marking. If the user chooses the "Save Task and Connect Call" button, task marking may be performed, and the incoming call may be connected. If the user chooses the "Proceed with Task and Ignore Call" button, the incoming call may be ignored, and the existing multitasking environment may be maintained. Moreover, if the user chooses the "Save Task and Connect Call" button, task marking may be initiated, and the incoming call may be connected. An exemplary display screen that may be displayed on the display module 151 during the call is illustrated in FIG. 9.

Figure 9:
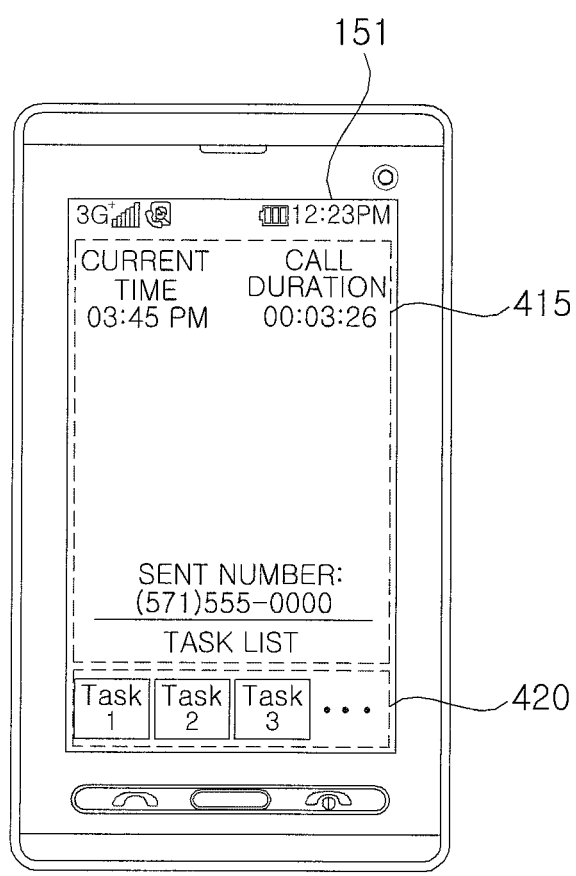

Referring to FIG. 9, if the user chooses to save the tasks and accept the incoming call, a call display screen 415 and a task list window 420 may be displayed on the display 151. The call display screen 415 may display information associated with the incoming call. The task list window 420 may display a task list that includes the plurality of saved tasks. Alternatively, the display 151 may display only one of either the display screen 415 or the task list window 420. Moreover, the mobile terminal 100 may be configured to automatically save the tasks based on a pre-stored setting or preference. In this case, when a call is received the task list may be displayed and/or saved without the need for a task mark request signal or a task mark selection window 410.

Figure 10:
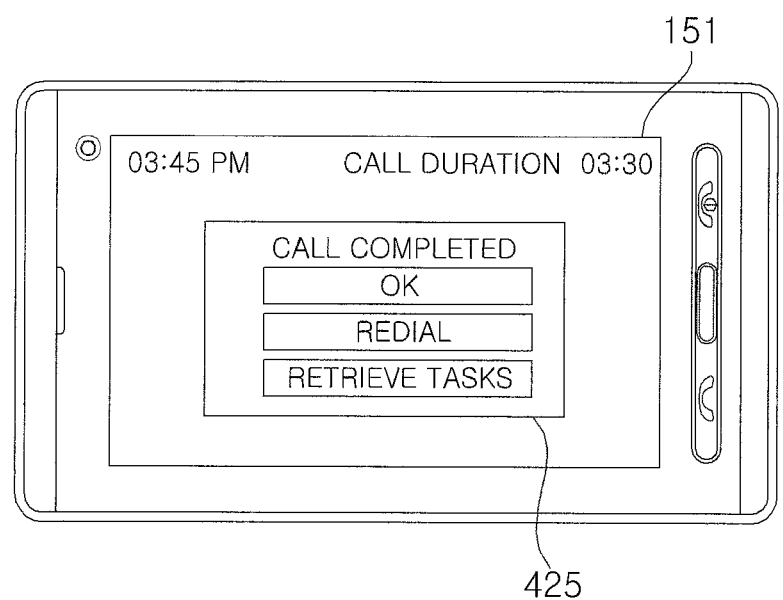

FIG. 10 illustrates an example of a display screen that may be displayed on the display module 151 after the completion of a task mark requiring event, for example, as shown and described with reference to FIG. 9. Referring to FIG. 10, when the call or another event associated with a task mark request in a multitasking environment is complete, a UI image 425 may be displayed on the display module 151 to allow the user to choose whether to retrieve or restore the marked tasks. For example, upon completion of the call, the user may select the "OK" or "Redial" buttons from the UI image 425 if there is no need to view a list of marked tasks or to retrieve marked tasks. On the other hand, in order to view a list of marked tasks or to retrieve marked tasks, the user may select the "Retrieve Task" button from the UI image 425 to retrieve and restore the stored tasks to their previous states.

Figure 11:
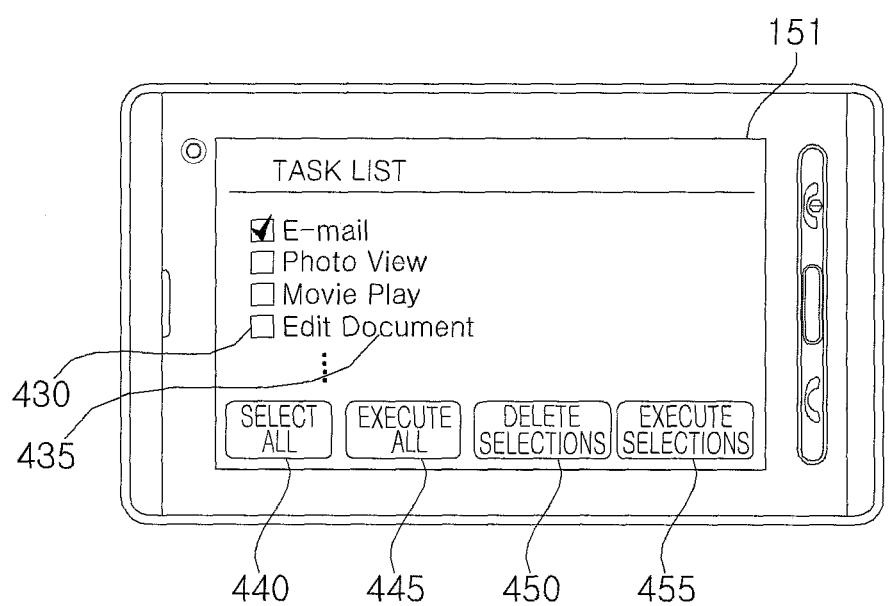
FIGS. 11 through 19 illustrate display screens of the mobile terminal during an operation to edit or display a list of marked tasks.

FIGS. 11 through 17 illustrate display screens of the mobile terminal 100 during an operation to edit or display a list of marked tasks. As previously described, the mobile terminal 100 may mark tasks and save them to a task list 435, as shown in FIG. 11. Thereafter, the mobile terminal 100 may display the task list 435 on the display module 151. Each item on the task list 435 may include a checkbox 430, and thus, each task included in the task list 435 may be selectively executed or deleted.

Referring to FIG. 11, the task list 435 may be provided without detailed information for each task to simply list the applications that were active at the time of task marking. Once a task is selected from the task list 435, the user may delete or execute the selected tasks by pressing the "Delete Selections" button 450 or the "Execute Selections" button 455, respectively. When the "Delete Selections" button 450 is selected, the selected tasks may be removed from the task list. When the "Execute Selections" button 455 is selected, the corresponding task may be restored to its previous state.

The user may also request detailed information to be displayed for each selected task on the task list 435 by selecting a "Detailed Information" button 460. Moreover, the user may edit the selected tasks by selecting an "Edit" button 465 or by selecting the "Copy/Move" button 470. For example, the "Edit" button 465 may allow modification of each task such as a playback position of a video, or the like. The "Copy/Move" button 470 may allow the selected task to be copied or moved to another task list stored on memory 160. In an embodiment, one or more of the buttons 440, 445, 450, 455, 460, 465, and 470 may not initially be displayed on display 151. In order to maximize the display area, these buttons may be provided in popup windows that are displayed, for example, when the user touches the display 151 for a predetermined period of time or at predetermined locations.

Figure 12:
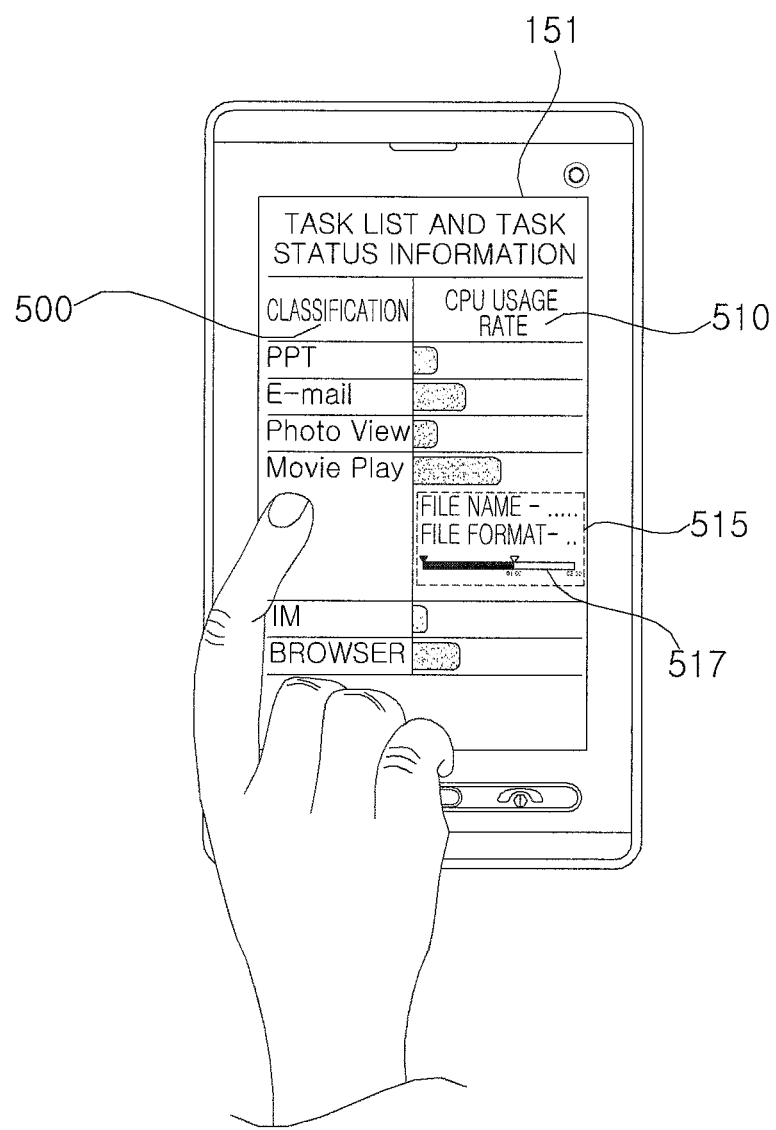

Referring to FIG. 12, a display screen showing a table entitled "Task List and Task Status Information" may be displayed on the display module 151. A first column 500 of the table, entitled "Classification," may list each task in the task list. A second column 510 of the table, entitled "CPU Usage Rate," may display task status information associated with each of the tasks in the task list. For example, the task status information may show how much of the mobile terminal resources are being used by each of the applications or tasks in the task list.

If the user selects one of the tasks listed in the first column of the table, detailed information corresponding to the selected task may be provided. For example, referring to FIG. 12, if the user selects the "Movie Play" task, detailed information 515 for the selected item may be displayed on the display 151. The detailed information 515 may include a filename and format of a video file that corresponds to the selected task. A progress bar 517 may also be displayed in the detailed information 515. The progress bar 517 may show a length of the video, a size of the video file, and a point where the playback of the video file was interrupted.

Each of the tasks listed in the first column of the table may be edited. For example, a submenu may be provided corresponding to the detailed information 515 to allow the user to edit, delete, copy or move the selected task. Alternatively, the user may readily edit the detailed information 515 by touching the detailed information 515 window. For example, if the user moves the slider in the progress bar 517 through a simple drag-and-drop input, the playback position of the video file may be modified.

Figure 13:
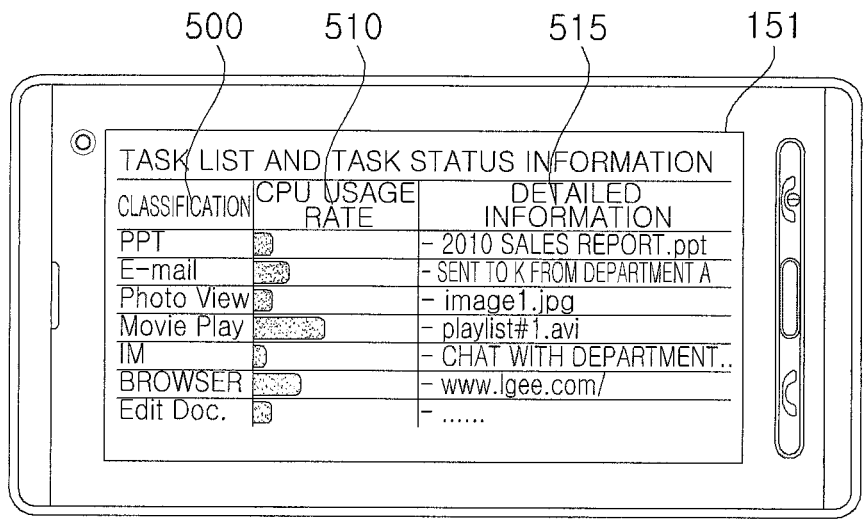
Figure 14:
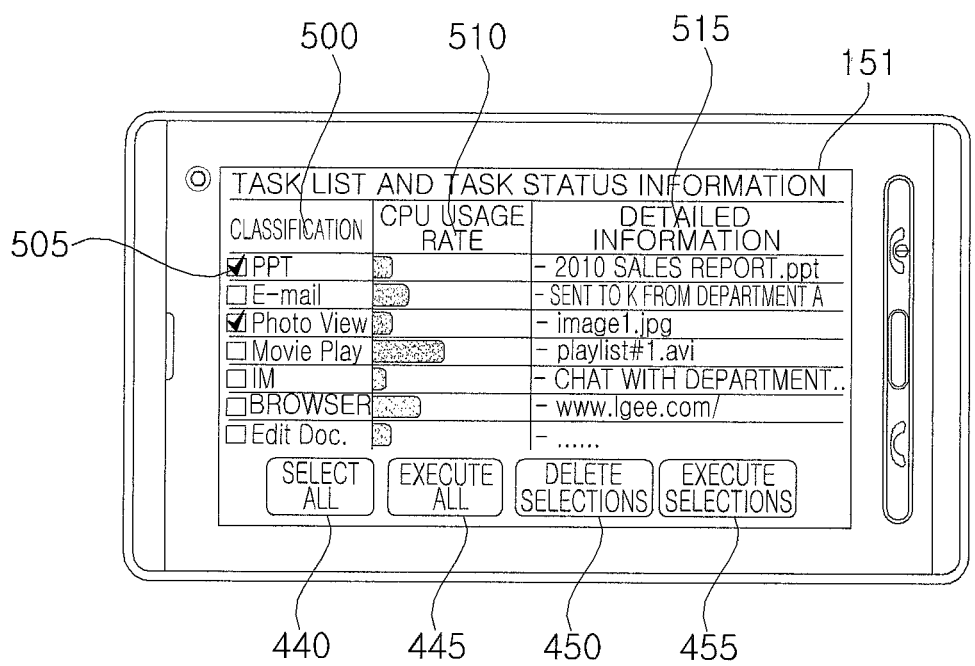

FIGS. 13 and 14 illustrate the display 151 that shows another configuration of the table that displays a task list and task status information. For example, when the mobile terminal 100 is rotated to a horizontal position from the vertical position as shown in FIG. 12, the table may be modified to display additional information. Referring to FIG. 13, a first column 500 of the table, entitled "Classification," may list each task in the task list. A second column 510, entitled "CPU Usage Rate," may show system resource usage rates corresponding to each task. A third column 515, entitled "Detailed Information," may show information related to each of the listed tasks. Referring to FIG. 14, a checkbox 505 may be provided for each of the tasks. Thus, each of the tasks may be selectively executed, deleted, or edited while having access to the information listed in the first, second, and third columns 500, 510, 515 of the table.

If the user selects the "Select All" button 440, all the tasks listed in the first column 500 may be selected. If the user selects the "Execute All" button 445, all the tasks listed in the first column 500 may be automatically executed, i.e., the same multitasking environment before the occurrence of a task marking-requiring event may be restored.

If the user selects some of the tasks listed in the first column 500 by clicking on the corresponding checkboxes 505, then selects the "Delete Selections" button 455, the selected tasks may be deleted. In this manner, the user may edit a task list. If the user selects some of the tasks listed in the first column 500 by clicking on the corresponding checkboxes 505 and then selects an "Execute Selections" item 455, the selected tasks may be executed. Moreover, the user may edit the selected tasks by selecting an "Edit" button 465 or by selecting the "Copy/Move" button 470. For example, the "Edit" button 465 may allow modification of each task such as a playback position of a video, or the like. The "Copy/Move" button 470 may allow the selected task to be copied or moved to another task list stored on memory 160. In an embodiment, one or more of the buttons 440, 445, 450, 455, 460, 465, and 470 may not initially be displayed on display 151. In order to maximize the display area, these buttons may be provided in popup windows that are displayed, for example, when the user touches the display 151 for a predetermined period of time or at predetermined locations.

Figure 15:
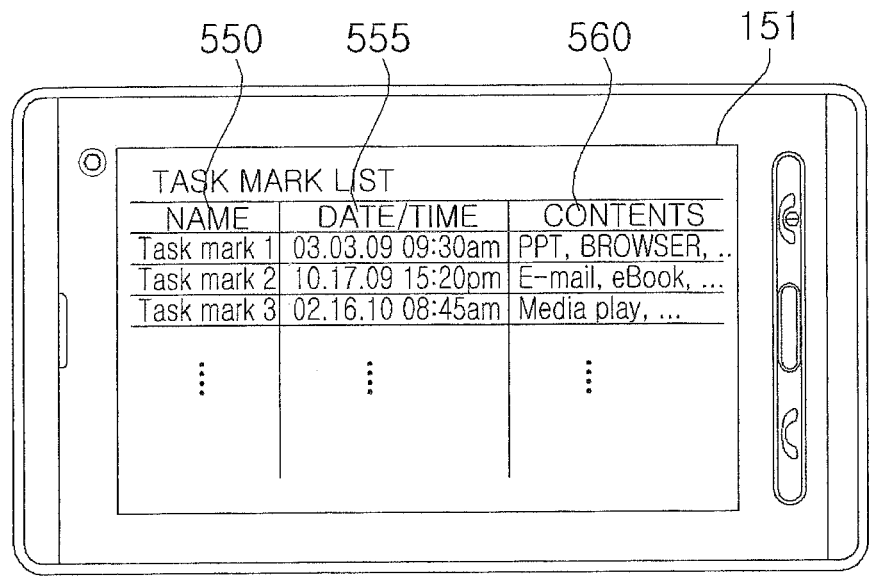

Referring to FIG. 15, a plurality of task lists may be displayed on display 151. If a plurality of task mark operations are performed and saved, each of the task lists may be listed in a table entitled "Task Mark List" on the display module 151. A first column 550 of the table, entitled "Name," may list the name of each of the plurality of task lists. A second column 555 of the table, entitled "Date/Time," may show when each of the plurality of task mark operations was performed. A third column 560 of the table, entitled "Contents," may show a list of tasks or applications which were open at the time of each of the plurality of task mark operations.

In embodiments of FIGS. 16 through 19, like in the embodiment of FIG. 15, when a plurality of task mark operations are performed and the results of each of the task mark operations are saved, a display screen showing a table entitled "Task Mark List" may be displayed on the display module 151. A first column 550 of the table, entitled "Name," may list the name of each of the plurality of task lists. A second column 555 of the table, entitled "Date/Time," may show when each of the plurality of task mark operations was performed. A third column 560 of the table, entitled "Contents," may show a list of tasks or applications which were open at the time of each of the plurality of task mark operations.

Figure 16:
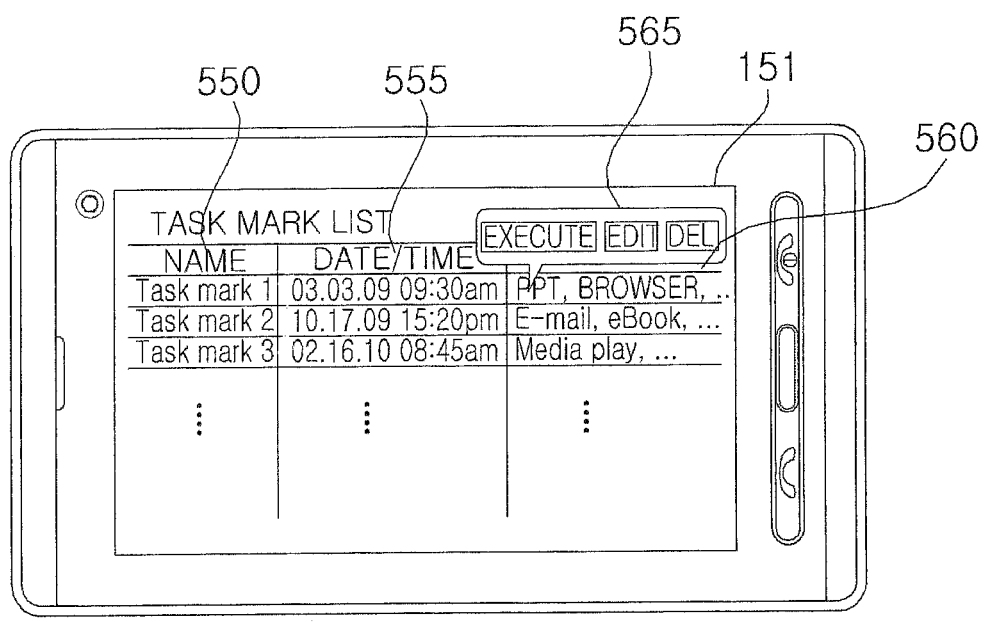

Referring to FIG. 16, a command input window 565 that corresponds to a task listed in the third column 560 may additionally be displayed on the display module 151. For example, the user may select a desired task or task mark operation from the table using a variety of methods to open a command input window 565 for the desired task or task mark operation. For example, if the mobile terminal 100 is equipped with a touch screen, the user may select the desired task or task mark operation using a touch input. The command input window 565 that corresponds to the desired task or task mark operation may then be displayed on the touch screen. Configuration of the display of the command input window 565, including the types or amount of data to be displayed, may be pre-stored in a user setting or a default setting in the mobile terminal 100.

If the user selects the "Execute" button from the command input window 565 activated by selecting one of the tasks listed in the third column 560, the controller 180 may execute the selected task or an application corresponding to the selected task. On the other hand, if the user selects the "Edit" button from the command input window 565, the selected task or a task list that corresponds to the selected task may be edited. For example, a file associated with the selected task may be edited or the task list that includes the selected task may be edited by deleting all or some of the tasks included in the task list. Moreover, if the user selects the "Delete" button from the command input window 565, the controller 180 may delete the selected task or the task list that includes the selected task. The command input window 565 may also display a "Copy/Move" button to allow the user to copy or move the selected task to another task list. For example, the selected task PPT from task list "Task Mark 1" may be moved or copied to task list "Task Mark 2".

Figure 17:
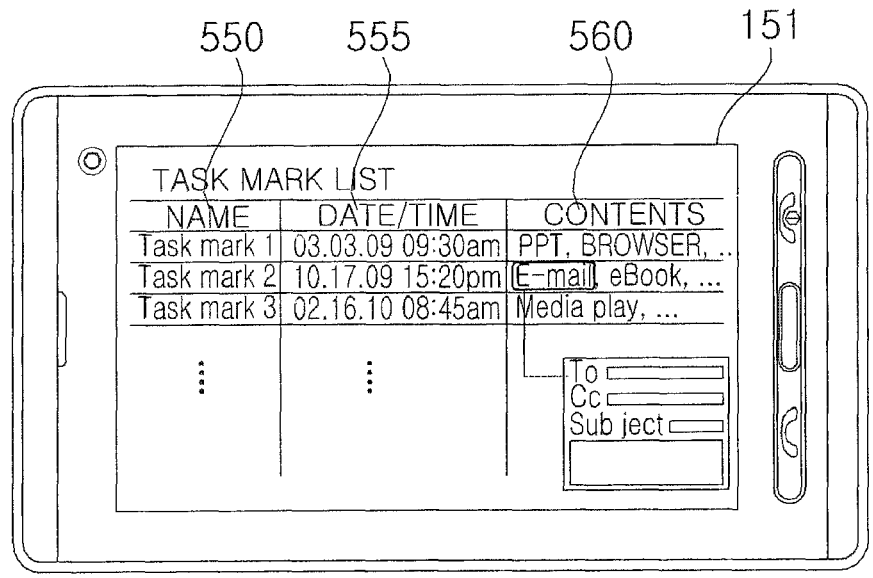

FIG. 17 illustrates a display screen that may be displayed on the display module 151 when the "Execute" button is selected from the command input window 565 of FIG. 16. If the user selects the "Execute" button from the command input window 565 when one of the tasks listed in the third column 560 is selected, for example, the "E-mail" task, the selected task may be executed or restored immediately. Then, an execution window corresponding to the selected task may be displayed on the display module 151. For example, the execution window or the application window may be displayed in the foreground of the display 151. Alternatively, the execution window may be displayed as a popup over the current display screen, as shown in FIG. 17.

Figure 18:
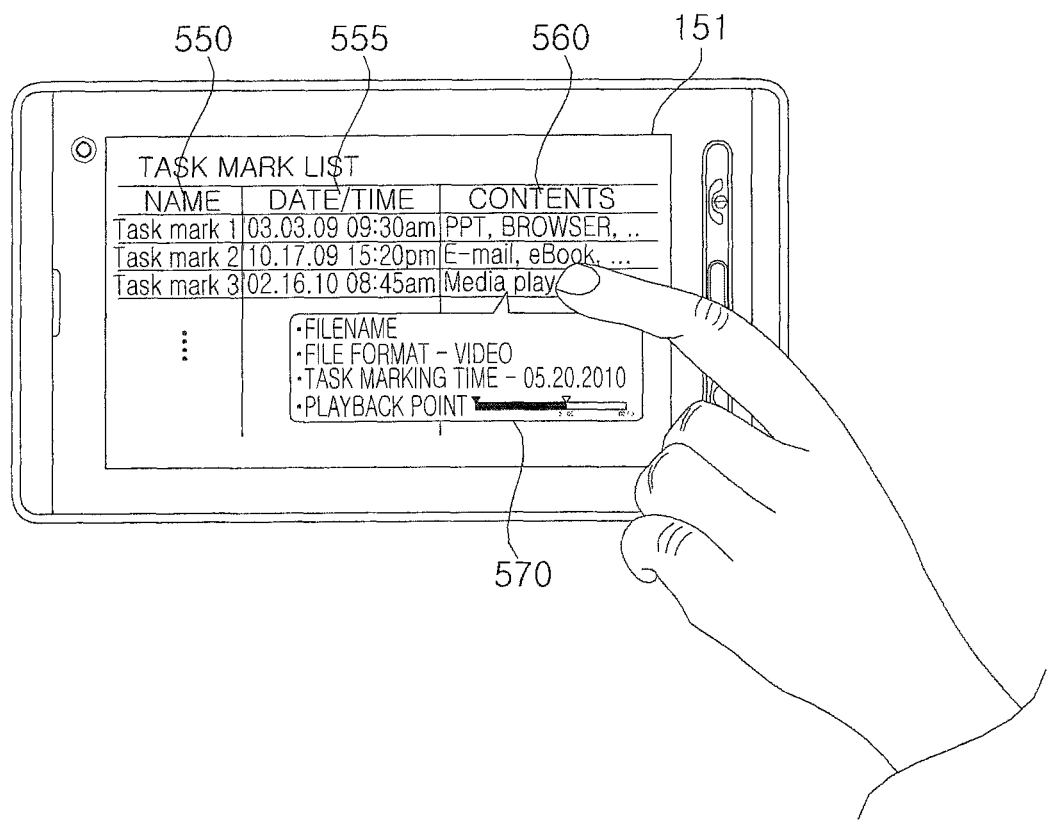

Referring to FIG. 18, a detailed information window 570 may be provided to display information related to a selected task. Due to the limited size of the display module 151, it may be not be desirable to display detailed information for all tasks displayed. Thus, the displayed detailed information may be limited to information that corresponds to the selected tasks and displayed in the detailed information window 570. Detailed task information that may be displayed in the detailed information window 570 may include the filename and file format of a file corresponding to each task, task marking time information indicating when task marking was performed on each task, playback point information indicating a point where playback of a multimedia file was interrupted, or other appropriate information associated with the selected task.

The detailed information window 570 may be used to edit or restore a corresponding task or associated application. A selected task may be edited or restored by touching the detailed information window 570 in a predefined manner. Referring to FIG. 18, if one of the tasks listed in the third column 560 is selected, a detailed information window 570 showing detailed information corresponding to the selected task may be displayed. The detailed information related to the selected task may include a filename, file format, task marking timestamp, playback time information, or other appropriate information associated with the selected task. The playback time information may be represented by a progress bar. For example, the progress bar included in the detailed information window 570 may be touched or clicked to edit a playback position of a multimedia file (e.g., a video file) upon execution. No restriction is imposed on which part of the detailed information window 570 should be touched or clicked in order to enter a command. If the user touches a part of the detailed information window 570 in a predefined manner, the controller 180 may interpret it as an execution command to restore the application or task.

The controller 180 may receive a signal to execute a task from various parts of the detailed information window 570 other than the progress bar. In addition, task editing may be performed using a display screen that shows a task list and using substantially the same method as described above for executing a task.

Figure 19:
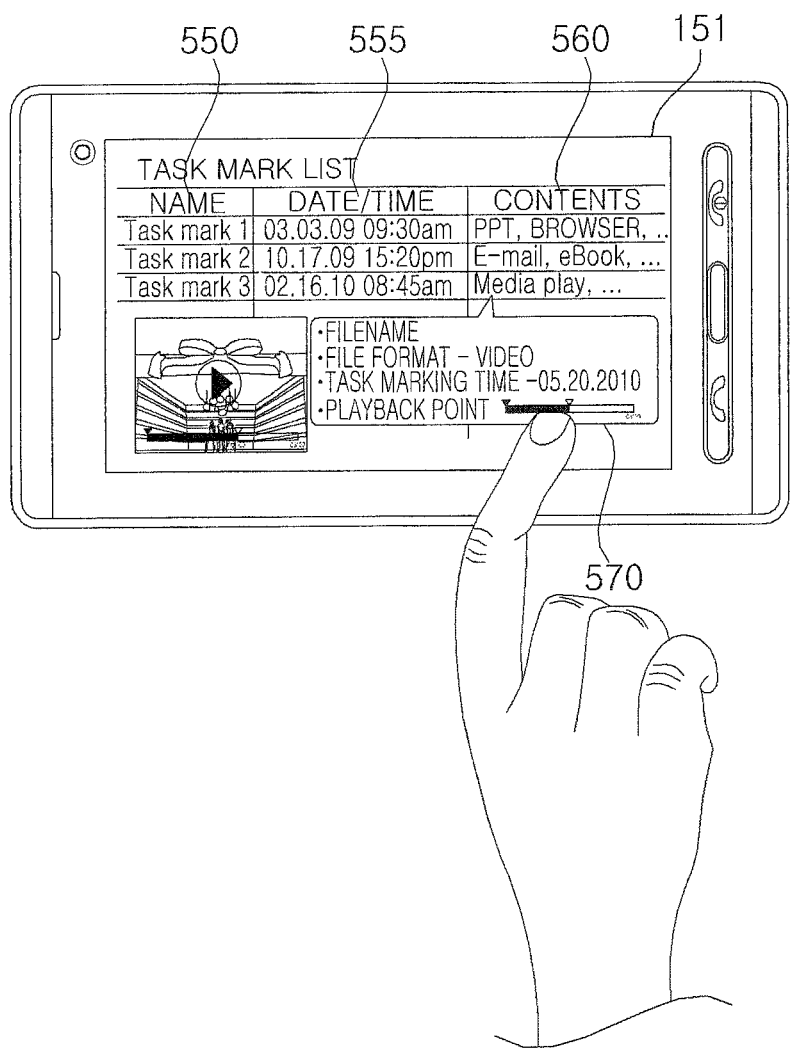

Referring to FIG. 19, if a particular portion of the progress bar in the detailed information window 570 is touched or clicked, the playback of a multimedia file (e.g., a video file) may be resumed from a playback point corresponding to the touched or clicked portion of the progress bar, and an execution window for video playback may be displayed on the display module 151. That is, one or more tasks may be selected from a display screen that displays a task list, and then the selected tasks may be readily executed or edited without leaving the display screen.

A method of operating a mobile terminal as broadly disclosed and embodied herein, may include executing a plurality of applications on the mobile terminal; detecting an event that may require termination of at least one of the applications; saving a task list that may include a current state information associated with the at least one of the applications, wherein the task list may be a list of the at least one of the applications and the current state information may include a current operational state; and displaying the saved task list, wherein the at least one of the applications may be restored based on the saved task list.

In the method, the detecting an event that requires termination of the at least one of the applications may include displaying a notification that corresponds to the event, wherein the notification includes an option to save the task list. The method may further include restoring an application on the saved task list.

In the method, the current state information may include at least one of a remaining resource information, remaining battery power information, filenames of data files, addresses of web pages opened or accessed, or playback point information of multimedia files, wherein the displaying the saved task list may include displaying the saved task list if the event that requires termination of the at least one of the applications is completed. Moreover, the method may further include editing and saving at least one of the task list or the current state information, and restoring the at least one of the applications according to the edited task list or the edited current state information.

In the method, the detecting the event that requires termination of the at least one of the applications may include detecting a user command to save the task list or the status information. The method may also include setting a task mark that corresponds to the event.

In another embodiment, a method of operating a mobile terminal may include executing a plurality of applications on the mobile terminal, detecting an event that may require termination of at least one of the applications, saving a task list that may include current state information associated with the at least one of the applications, wherein the task list may be a list of the at least one of the applications and the current state information may include state information associated with the plurality of applications, displaying the saved task list, wherein the at least one of the applications may be restored based on the saved task list, retrieving the saved task list that may include the current state information associated with the at least one of the applications, wherein the current state information may further include data that allows the at least one of the applications to return to a previous operational state, wherein the previous operational state is a state of the plurality of applications during a previous use by a user, and executing the at least one of the applications based on the current state information stored on the task lists.

In the method, the detecting an event that requires termination of the at least one of the applications may include displaying a notification that corresponds to the event, wherein the notification includes an option to save the task list. The method may further include restoring an application on the saved task list.

In the method, the event is a user input to generate the task list, wherein the task list includes all applications that are running at the time of the event. Moreover, in the method, the current state information includes at least one of a remaining resource information, remaining battery power information, filenames of data files, addresses of web pages opened or accessed, or playback point information of multimedia files, wherein the displaying the saved task list includes displaying the saved task list if the event that requires termination of the at least one of the applications is completed. The method may further include editing and saving at least one of the task list or the current state information, and restoring the at least one of the applications according to the edited task list or the edited current state information.

In the method, the detecting the event that requires termination of the at least one of the applications may include detecting an input to save the task list or the current state information. The method may further include setting a task mark that corresponds to the event.

In anther embodiment, a method of controlling a mobile device may include retrieving an application startup file that may include state information associated with a predefined group of applications, wherein the application startup file may be a list of the applications in the predefined group and the state information may include data to allow the applications to return to a previous operational state, wherein the previous operational state is a state of the applications during a previous use by a user, and launching the predefined group of applications based on the state information stored on the application startup file.

The present application or patent provides a mobile terminal capable of saving a number of tasks upon the occurrence of an event and retrieving the saved tasks at any time necessary and a method of operating the mobile terminal. According to an aspect of the present application or patent, there is provided a method of operating a mobile terminal, wherein the method may include executing two or more applications; detecting the occurrence of an event that requires termination of the applications; and saving a task list including the applications and terminating execution of the applications.

According to another aspect of the present application or patent, there is provided a mobile terminal that may include a memory; a controller configured to execute two or more applications, wherein, if an event that requires termination of the applications occurs, the controller may save a task list which includes the applications in the memory; and a display module configured to display a display screen relevant to the driving of the applications.

As disclosed herein, according to the present application or invention, it may be possible to easily check the status of each application in a multitasking environment where two or more applications are being driven at the same time. In addition, it may be possible to save tasks through task marking for later use. Therefore, it may possible to resume the saved tasks from where they were interrupted without causing any confusion or inconvenience.

The present application or invention may be realized as code that may be read by a processor (such as a mobile station modem (MSM)) included in a mobile terminal and which may be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium may be distributed over a plurality of computer systems connected to a network such that computer-readable code is written thereto and executed therefrom in a decentralized manner. Functional programs, code, and code segments needed to realize the present application or invention can be easily construed by one of ordinary skill in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a mobile terminal, the method comprising:
    executing a plurality of applications on the mobile terminal at the same time;
    detecting an event that requires termination of at least one of the applications;
    saving a task list that includes a list of the at least one of the applications and a current state information associated with the applications included in the task list, wherein the task list is a list of applications to be executed at the same time and the current state information includes an operational state at the time of the event, and if a list of the applications or the current state information is edited, the task list is saved according to the edited list of the applications or the edited current state information;
    displaying at least one of the saved task list or current state information if the event that requires termination of the at least one of the applications is completed;
    if a task edit signal is detected while the at least one of the saved task list or current state information is displayed, editing at least one of the task list or the current state information according to the detected task edit signal; and
    re-executing the terminated applications based on at least one of the edited task list or the edited current state information.

2. The method of claim 1, wherein the detecting an event that requires termination of the at least one of the applications includes displaying a notification that corresponds to the event, wherein the notification includes an option to save the operational states of the plurality of applications executing at the time of the event.

3. The method of claim 1, wherein the current state information includes at least one of a remaining resource information, remaining battery power info nation, filenames of data files, addresses of web pages opened or accessed, or playback point information of multimedia files.

4. The method of claim 1, wherein the detecting the event that requires termination of the at least one of the applications includes detecting a user command to save the task list or the current state information.

5. The method of claim 1, further comprising setting a task mark that corresponds to the event.

6. A method of operating a mobile terminal, the method comprising:
    executing a plurality of applications on the mobile terminal at the same time;
    detecting an event that requires termination of at least one of the applications, the event being an interrupt from a first application that requires a second application to terminate while the second application is executing;
    saving a task list that includes a list of the at least one of the applications and a current state information associated with the applications included in the task list in response to the interrupt, wherein the current state information includes state information associated with the plurality of applications at the time of the event, and if a list of the applications or the current state information is edited, the task list is saved according to the edited list of the applications or the edited current state information;
    displaying at least one of the saved task list or current state information if the event that requires termination of the at least one of the applications is completed, wherein the at least one of the applications is restored based on the saved task list;

retrieving the saved task list that includes the current state information associated with the at least one of the applications, wherein the current state information further includes data that allows the at least one of the applications to return to a previous operational state, wherein the previous operational state is a state of the plurality of applications during a previous use by a user;

if a task edit signal is detected while the at least one of the saved task list or current state information is displayed, editing at least one of the task list or the current state information according to the detected task edit signal; and re-executing the terminated applications based on at least one of the edited task list or the edited current state information.

7. The method of claim 6, wherein the detecting an event that requires termination of the at least one of the applications includes displaying a notification that corresponds to the event, wherein the notification includes an option to save the operational states of the plurality of applications executing at the time of the event.

8. The method of claim 6, further comprising restoring an application on the saved task list.

9. The method of claim 6, wherein the event is a user input to generate the task list, wherein the task list includes all applications that are running at the time of the event.

10. The method of claim 6, wherein the current state information includes at least one of a remaining resource information, remaining battery power information, filenames of data files, addresses of web pages opened or accessed, or playback point information of multimedia files.

11. The method of claim 6, wherein the detecting the event that requires termination of the at least one of the applications includes detecting an input to save the task list or the current state information.

12. The method of claim 6, further comprising setting a task mark that corresponds to the event.

13. The method of claim 6, wherein the interrupt is generated in response to a phone call received at the first application.

14. A mobile terminal comprising:

a memory;

a controller configured to execute a plurality of applications on the mobile terminal at the same time, wherein if an event that requires termination of at least one of the applications is detected the controller generates a notification to save a task list, the task list being a list of applications executing at the time of the event for subsequent restoring, the controller saves the task list that includes the list of the at least one of the applications and a current state information associated with the applications included in the task list in the memory, wherein the current state information includes an operational state at the time of the event, wherein if a list of the applications or the current state information is edited, the controller saves the task list according to the edited list of the applications or the edited current state information; and a display module configured to display at least one of the saved task list or current state information if the event that requires termination of the at least one of the applications is completed, wherein if a task edit signal is detected while the at least one of the saved task list or current state information is displayed, the controller edits at least one of the task list or the current state information according to the detected task edit signal, and re-executes the terminated applications based on at least one of the edited task list or the edited current state information.

\* \* \* \* \*